Patented Dec. 6, 1949

2,490,424

UNITED STATES PATENT OFFICE 2,490,424

BROMINATED GARLIC CARMINATIVE

Edgar A. Ferguson, Jr., Brooklyn, N. Y., assignor to Van Patten Pharmaceutical Company, Chicago, Ill., a corporation of Illinois No Drawing. Application July 6, 1945,
Serial No. 603,573

3 Claims. (Cl. 167—65)

The present invention relates to a new and improved therapeutic agent and more particularly to a carminative preparation which acts as an aid or stimulant in the digestion and absorption of food and which is thus effective as an adjunctive in the treatment of flatulence, distinction, and related gastro-intestinal disorders.

Carminatives have been known, of course, for many years. One of the oldest materials employed for this purpose is an extract from garlic (Allium sativum). According to most authorities the ingredient of garlic which is chiefly responsible for its carminative effect is the evil-smelling and acrid-tasting volatile oil, diallyl sulfide, $CH_2=CHCH_2-S-CH_2CH=CH_2$. Other ingredients of garlic may have some slight carminative action but, compared to that of the contained diallyl sulfide, the effect is considered to be negligible.

It is the purpose and one of the principal objects of the present invention to provide a new and improved carminative preparation derived from garlic but having the advantage that it is free of the undesirable pungent odor and acrid taste always heretofore associated with natural garlic.

It is a further object to provide a deodorized garlic carminative preparation having an improved and enhanced effect in the treatment of gastro-intestinal disorders of the foregoing character.

It is a still further object to provide a process for the preparation of a new garlic derivative useful in combating the foregoing distresses in the human system.

In accordance with the present invention, the new carminative is prepared by treating crushed garlic bulbs, either containing their natural moisture content or previously desiccated, with elemental bromine in an aqueous, mildly alkaline organic solvent medium. It has been found, further in accordance with the invention, that this mildly alkaline bromination results in the conversion of the diallyl sulfide to allyl bromide in accordance with the following equation:

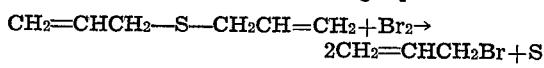

Other brominating reactions probably take place to a lesser extent including, first of all, the reaction between the bromine and the alkali to produce alkaline bromides which, in turn, react with the inorganic salt content of the garlic bulbs to produce, by metathesis, bromides of the metals of the salts originally contained in the garlic bulbs. Furthermore, the protein content of the garlic bulbs is likewise converted into brominated derivatives. As far as it concerns the discovery upon which the present invention is predicated, by far the most important reaction is that between bromine and the diallyl sulfide. The resulting allyl bromide, in other words, constitutes the effective carminative ingredient of the mixture resulting from the alkaline bromination of garlic. Furthermore, when the diallyl sulfide is converted to diallyl bromide, the objectionable odor and taste associated with the diallyl sulfide completely disappears. It may be pointed out in this connection that this conversion of diallyl sulfide to allyl bromide actually takes place in the bromination process because a small amount of elemental sulfur is liberated during the reaction and remains identifiable in the reaction mass.

For a further understanding of the invention, the following specific example of the process resulting in the new carminative preparation is given by way of example although it is to be understood, of course, that the invention is in no way limited thereto.

10 pounds of garlic bulbs (containing their natural moisture content) are crushed in a suitable vat and then there is added thereto 25 cc. of an 8% solution of sodium hydroxide made up by adding 2 grams of sodium hydroxide to 25 cc. of water. After the solution of sodium hydroxide is added, the mixture is titrated with phenolphthalein. It should be found to be the equivalent of 0.55 cc. of 0.1 HCl. If the titration shows a lower figure, it must be corrected by adding more sodium hydroxide solution. In any event the pH of the mixture at this point should be above 9 (red to phenolphthalein).

Desiccated garlic may be used in the foregoing procedure in which case 8 pounds (1 gallon) of water would be added to 2 pounds of desiccated garlic before the alkali is added.

There is then added to the mixture 20 cc. of ethyl alcohol. After addition of the alcohol the mixture is continuously stirred in the vat while adding 0.4 pound of liquid National Formulary bromine. The bromine is added slowly over a period of one-half hour and then the mixture is allowed to stand for at least four hours. The mixture is then desiccated to give the final product, which is a brown-black powder.

It is to be understood, of course, that other alkalis in corresponding strength may be substituted for the sodium hydroxide in the process. Potassium hydroxide is suitable, as are the alkali carbonates such as sodium or potassium carbonate.

Furthermore, other low molecular weight common organic solvents may be substituted for the ethyl alcohol so long as they are of such non-toxicity to the human system that no toxic materials contained therein would remain in the final product after desiccation. Methyl and propyl alcohols may be employed, as well as acetone.

The average dosage of the brominated and deodorized garlic carminative, for adult administration, is five grains, to be taken after eating.

What is claimed is:

1. A process for preparing a new carminative preparation which comprises adding elemental bromine slowly to crushed, chemically-unaltered garlic bulbs in a mildly alkaline, aqueous organic solvent medium and recovering the resulting solid product containing the brominated as well as the unbrominated portions of the garlic bulbs.

2. A process for preparing a new carminative preparation which comprises crushing chemically-unaltered garlic bulbs, adding thereto an 8% sodium hydroxide solution in sufficient amount to give the resulting mixture a pH in excess of 9, adding ethyl alcohol, brominating with elemental bromine, desiccating the mixture and then recovering the resulting solid product containing the brominated as well as the unbrominated portion of the garlic bulbs.

3. A new carminative preparation consisting of the solid product obtained by carrying out a process consisting essentially of reacting elemental bromine slowly with chemically unaltered, crushed garlic bulbs in a mildly alkaline, aqueous organic solvent medium and then drying and recovering the resulting solid product, said solid product containing the brominated as well as the unbrominated portion of the garlic bulb.

EDGAR A. FERGUSON, Jr.

REFERENCES CITED

The following references are of record in the file of this patent:

FOREIGN PATENTS

| Number | Country | Date |
|---|---|---|
| 626,469 | Germany | Feb. 26, 1936 |

OTHER REFERENCES

Gutman, Modern Drug Encyclopedia, 1941, New Modern Drugs, New York, page 25.

Handbook of Chemistry and Physics, 28th ed., pub. by Chem. Rubber Publishing Co., Cleveland, Ohio.

National Dispensatory, 5th ed. (1896), pub. by Lea Bros. and Co., Philadelphia, pages 159–160.

Pharmazeutische Zeitung, vol. 81, page 440.